United States Patent
Lanter (10) Patent No.: US 9,555,769 B2
(45) Date of Patent: Jan. 31, 2017

(54) BELT LOCK WITH A STATE SENSOR FOR DETECTION OF THE LOCKING STATE OF A SAFETY BELT SYSTEM

(75) Inventor: Josua Lanter, Chur (CH)

(73) Assignee: POLYCONTACT AG, Chur (CH)

( * ) Notice: Subject to any disclaimer, the term of this patent is extended or adjusted under 35 U.S.C. 154(b) by 1227 days.

(21) Appl. No.: 13/487,712

(22) Filed: Jun. 4, 2012

(65) Prior Publication Data

US 2012/0310483 A1 Dec. 6, 2012

(30) Foreign Application Priority Data

Jun. 3, 2011 (CH) ...................................... 0944/11

(51) Int. Cl.
*B60R 22/00* (2006.01)
*B60R 22/48* (2006.01)

(52) U.S. Cl.
CPC ........ *B60R 22/48* (2013.01); *B60R 2022/4816* (2013.01); *Y10T 24/45241* (2015.01)

(58) Field of Classification Search
CPC .......................... B60R 22/48; B60R 2022/4816
See application file for complete search history.

(56) References Cited

U.S. PATENT DOCUMENTS

| | | | |
|---|---|---|---|
| 4,754,105 A * | 6/1988 | Doty .................. | A44B 11/2523 200/61.58 B |
| 5,274,890 A * | 1/1994 | Shimizu .............. | A44B 11/2511 24/603 |
| 5,742,986 A * | 4/1998 | Corrion et al. ................. | 24/633 |
| 5,898,366 A * | 4/1999 | Brown et al. .............. | 340/457.1 |
| 5,944,135 A * | 8/1999 | Blackburn et al. ........... | 180/268 |
| 5,966,784 A * | 10/1999 | Arbogast et al. ............... | 24/633 |
| 5,970,587 A * | 10/1999 | Knox .................. | A44B 11/2565 24/603 |
| 6,474,435 B1 * | 11/2002 | Devereaux ..................... | 180/270 |
| 6,988,297 B2 * | 1/2006 | Willard .............. | A44B 11/2576 24/633 |
| 7,842,894 B2 * | 11/2010 | Borst ...................... | B60R 22/48 200/61.58 B |
| 8,090,504 B2 * | 1/2012 | Long ...................... | B60R 22/48 180/286 |
| 8,240,012 B2 * | 8/2012 | Walega .............. | A44B 11/2523 24/603 |
| 2006/0012236 A1 * | 1/2006 | Kock ...................... | B60R 22/48 297/469 |

(Continued)

FOREIGN PATENT DOCUMENTS

| | | |
|---|---|---|
| DE | 10 2010 039 960 A1 | 4/2011 |
| EP | 1 585 276 A1 | 10/2005 |
| WO | 2008/095320 A1 | 8/2008 |

*Primary Examiner* — Tuan C. To
(74) *Attorney, Agent, or Firm* — Buchanan Ingersoll & Rooney PC (57) ABSTRACT

A belt lock is provided with a state sensor for detection of the locking state of a safety belt system, for example in an motor vehicle. The belt lock includes a locking mechanism which is located in a belt lock housing, which is formed from an upper shell and a lower shell, for an inserted belt tongue which has a component which changes its location from a first end position into a second end position when the locking mechanism is actuated. Actuation of the locking mechanism can be monitored by the state sensor. The state sensor is made as an electronic sensor element which is located in the lower shell.

37 Claims, 3 Drawing Sheets

(56) References Cited

U.S. PATENT DOCUMENTS

| | | |
|---|---|---|
| 2010/0102906 A1 | 4/2010 | Lanter |
| 2010/0283593 A1* | 11/2010 | Miller .................. B60C 23/0408 340/447 |
| 2011/0084827 A1* | 4/2011 | Lanter ..................... B60R 22/48 340/457.1 |
| 2011/0094067 A1 | 4/2011 | Lombriser et al. |
| 2012/0137478 A1* | 6/2012 | Nimura ................... B60R 22/48 24/593.1 |

* cited by examiner

BELT LOCK WITH A STATE SENSOR FOR DETECTION OF THE LOCKING STATE OF A SAFETY BELT SYSTEM

RELATED APPLICATION(S)

This application claims priority under 35 U.S.C. §119 to European Patent Application No. 00944/11 filed in Switzerland on Jun. 3, 2011, the entire content of which is hereby incorporated by reference in its entirety.

FIELD

The present disclosure relates to a belt lock with a state sensor for detection of the locking state of a safety belt system, for example in a motor vehicle.

BACKGROUND INFORMATION

In technical applications such as, for example, a motor vehicle construction and the like, it is often necessary to quickly and reliably detect the location of a component which can be moved into two end positions relative to a stationary part using measurement engineering. For example, in passenger restraint systems of motor vehicles, it has to be checked whether a passenger is belted or not.

For this reason, the proper locking of the tongue of the safety belt, which tongue has been inserted into the belt lock, must be checked. Knowledge of the locking state of the belt lock is necessary to notify the passengers by a signal to put on and lock the safety belts. Since the introduction of safety airbags, information about the locking state of the safety belts has also been important for activation or deactivation of mechanisms for inflating driver and passenger airbags, as well as side and head airbags.

EP-B-1 585 276 discloses a belt lock whose locking state is monitored by a switch which can be mechanically actuated. The switch consists of a fixed contact sheet and a contact sheet which is made as a spring contact and which projects into the displacement path of a slide which can be moved into two end positions. The slide presses against a middle bent region of the spring contact in the case of locking, as a result of which one contact end which is hammer-shaped comes into contact with the fixed contact sheet. However, this known belt lock switch is susceptible to faults. If the spring contact is made too solid, it can disrupt the displacement motion of the slide and by blocking the slide in the middle position can even lead to a malfunction of the belt lock. Conversely, if the spring contact is made so thin that its inherent spring force cannot hinder the slide in any case, in operation of the motor vehicle it tends to rattle. There is also a certain risk that the middle bent region of the spring contact will deform over time. This can lead to the hammer-shaped contact end no longer coming into contact with the fixed contact sheet, and in this way the locking state of the safety belt will no longer be detected and/or displayed. In the worst case, the spring contact can even break due to continuous vibrations, which likewise leads to the locking state of the belt lock no longer being able to be detected.

DE 10 2010 039 960 A1 (corresponding to US 2011/0094067 A1) has proposed a belt lock for a safety belt system in which a switching arrangement which can be mechanically actuated is located in a lower shell of the belt lock housing which is formed from two housing shells. The switch arrangement has at least one fixed contact part and one switching contact part which can move relative to the fixed contact part and which in one end position of an ejector of the belt lock is acted upon by the fixed contact part. The movable switching contact part is made as a stable spring clip sheet with two axially running side webs and a transverse web and has at least two elbow-like bows which in one end position of the axially movable ejector are pressurized by the latter. In the bottom part of the frame of the belt lock, there are recesses of the elbow-like bows of the movable switching contact part. Due to the especially flat execution of the switching arrangement which can be mechanically actuated with only two interacting flat sheets, the space available in the lower shell is sufficient. Regardless of the fact that the two flat sheets are made very stable and can be mounted relatively easily in the lower shell, this arrangement for ascertaining the closing state of the belt lock is a purely mechanical design.

WO 2008/095320 describes a belt lock in which the closing state of the belt lock is monitored without contact using a solenoid-operated switch. The solenoid-operated switch is located underneath the frame of the belt lock in the region of a recess for the locking body for the belt lock tongue. According to one representation which is not detailed in the document, the solenoid-operated switch can be located on the bottom of the lower shell of the belt lock. The solenoid-operated switch has a magnet which is located in a housing and which is electrically conductive at least in areas and thus can conductively bridge two electrical contacts of two electrical conductors. By changing the location of the locking body, the magnet within the housing can be moved, as a result of which the electrical contact between the two conductors is interrupted or closed. The contactless monitoring of the locking state of the belt lock with a solenoid-operated switch is very efficient, but dictates a separate switching element, specifically a solenoid-operated switch, with a movable magnet which can be moved out of a first end position into a second end position when an attractor element is moved.

Mechanical switches and solenoid-operated switches, depending on their design, are more or less susceptible to vibrations and impacts as can occur especially in a motor vehicle. Mechanical switches, but also the solenoid-operated switch, have wear of the electrical contacts over time. This is a consequence of the mechanical abrasion and a certain erosion during opening and closing of the electrical contacts. Here, the rebound behavior of the mechanical switch and of the solenoid-operated switch also plays a part. Abrasion which occurs in the actuation of the switch can lead to contact difficulties. Fouling from the outside can also occur in mechanical switches.

SUMMARY

An exemplary embodiment of the present disclosure provides a belt lock which includes a state sensor for detection of a locking state of a safety belt system, a belt lock housing having an upper shell and a lower shell, and a locking mechanism which is located in the belt lock housing for insertion of a belt tongue which has a component which changes its location from a first end position into a second end position when the locking mechanism is actuated. The state sensor is configured to monitor actuation of the locking mechanism by monitoring the position of the component of the belt tongue. The state sensor includes an electronic sensor element which is located in the lower shell.

BRIEF DESCRIPTION OF THE DRAWINGS

Additional refinements, advantages and features of the present disclosure are described in more detail below with reference to exemplary embodiments illustrated in the drawings, which are not shown to scale, and in which.

DETAILED DESCRIPTION

Exemplary embodiments of the present disclosure remedy the defects of known belt locks with mechanical switches and solenoid-operated switches as state sensors for the locking state of a belt lock. The effort for monitoring the locking state of a belt lock is to be still further reduced. A belt lock with a state sensor will be devised which is insensitive to vibrations and impacts, but also to fouling. The state sensor is designed to make it possible to ascertain the locking state without contact in order to ensure that the operation of the belt lock is not adversely affected. It is possible to keep the size of the belt lock housing unchanged. Simple and economical installation of the state sensor is to be enabled.

These features are achieved in the present disclosure in a belt lock with a state sensor for detection of the locking state of a safety belt system, for example in a motor vehicle which has the features described in more detail below.

An exemplary embodiment of the present disclosure provides a belt lock with a state sensor for the detection of the locking state of a safety belt system, for example in a motor vehicle. The exemplary belt lock includes a locking mechanism which is located in a belt lock housing which is formed from an upper shell and a lower shell for an inserted belt tongue, which has a component which changes its location from a first end position into a second end position when the locking mechanism is actuated. The exemplary belt lock also includes a state sensor by means of which the actuation of the locking mechanism can be monitored. In contrast to known techniques, the state sensor is made as an electronic sensor element which is located in the lower shell.

The state sensor being made as an electronic sensor element enables contactless monitoring of a component which changes its position during locking. The electronic sensor component manages without additional switching components which must change their position as a result of the change in the position of the monitored component in order to generate a signal. As a result of the absence of mechanically moving components, the problem of adverse mechanical effects, such as for example abrasion, erosion or contact wear, but also fouling, is eliminated. The electronic sensor element is insensitive to vibrations and impacts, and does not have any rebound behavior either which would have to be considered in the configuration of the state sensor. The electronic sensor element has a very compact construction.

The arrangement of the electronic sensor element directly in the lower shell of the belt lock housing facilitates the assembly and also allows simple automation of the assembly process. The locking mechanism which has a series of mechanical parts and components which can move relative to one another and which must be made very durable due to the required strengths requires a completely different assembly technique which is not always compatible with the manipulation regulations for electronic components. The arrangement of the electronic sensor element in the lower shell enables mounting of the locking mechanism and the production of the lower shell together with the mounting of the electronic sensor element to proceed completely separately from one another. The electronic sensor element is moved into the action region of the component of the locking mechanism which is to be monitored only when the upper shell and lower shell are joined to form the belt lock housing which surrounds the locking mechanism.

The electronic sensor element which is located in the lower shell is connected to a higher-order electrical system, for example, to a motor vehicle electrical system. Since electrical connections always can constitute a possible fault source and can be subject to mechanical stress, it is advantageous if the electronic sensor element is made such that the linkage to the higher-order electrical system takes place via only two electrical leads.

In accordance with an exemplary embodiment of the present disclosure, the electronic sensor element which is located in the lower shell is a Hall sensor. The excitation of the Hall sensor to signal generation takes place via a magnet which is located in or on the monitored component and travels into the action region of the Hall sensor when the locking mechanism is actuated.

In accordance with an exemplary embodiment, the monitored component of the locking mechanism can be, for example, a locking body for a belt tongue which has been inserted into the belt lock. In this way, the component which is responsible for locking is directly monitored. In accordance with an exemplary embodiment, the monitored part can be, for example, an ejector for the belt tongue which generally moves perpendicular to the displacement motion of the locking body when the locking mechanism is actuated.

In accordance with an exemplary embodiment of the present disclosure, the electronic sensor element which is located in the lower shell can be an electrical coil whose inductance can be changed depending on the change in the position of the monitored component. The sensor element which is made as a coil has a very simple and relatively small construction and exploits only the variability of the inductance of a coil as a result of the change in the position of the monitored component. The arrangement is insensitive to electromagnetic noise fields and to an interfering magnet which the user of the sensor belt can have inserted, for example. Due to the absence of moving mechanical contacts or the like there is no mechanical wear.

In accordance with an exemplary embodiment, the monitored component can be a locking body of the locking mechanism. For interaction with the coil, the locking body can be made metallic at least in regions.

The arrangement of the coil in the lower shell is advantageous such that the locking body or a metallic extension which projects away from the latter in one of its end positions, for example in the locking position, dips in part axially into the interior of the coil.

In accordance with an exemplary embodiment, a simple manner of ascertaining a change of the inductance of the coil presents itself when the coil is a component of an oscillator circuit. This oscillator circuit includes a capacitor and a coil which are connected in series or in parallel. The following applies to the natural frequency of the oscillator circuit:

$$f_r=(1/2\pi)\cdot 1/(L\cdot C)^{1/2}$$

In both circuit versions, the natural frequency of the oscillator circuit is proportional to the inverse of the square root of the inductance. If the inductance is changed, the natural frequency of the oscillator circuit also changes.

An exemplary embodiment of the present disclosure provides for the oscillator circuit to be connected to an evaluation element. The evaluation element allows, for example, the stipulation of a threshold value for the oscillation frequency change. When the threshold value is exceeded, for example, when there is a minimum oscillation frequency change, a signal can be generated which indicates the presence of a state change of the component which can be changed with respect to its position. This signal can be used, for example, for activation or deactivation of a warning indicator or can be supplied to a control unit for activation of passenger restraint and capture systems.

In accordance with an exemplary embodiment of the present disclosure, the electronic sensor element which is located in the lower shell can be a photoelectric barrier. Photoelectric barriers are time-tested electronic switching elements which cannot be influenced by external magnetic fields. They have a simple structure and, as a result of the arrangement of the light source and the photodetector in the lower shell, are essentially invulnerable to vibrations and impacts since these mechanical effects always act on the two components at the same time and in the same way.

In accordance with an exemplary embodiment of the belt lock with a photoelectric barrier, the sensor element calls for the light source of the photoelectric barrier which is, for example, formed by a LED to be used moreover to illuminate an insertion slot into the belt lock. The light of the LED can also be routed in a type of light tube so that the LED on the one hand can optimally perform its illumination function of the insertion slot, and on the other hand the light of the LED can also be optimally aligned to the photodetector.

In accordance with an exemplary embodiment, the component which is monitored with the photoelectric barrier can be a locking body for a belt tongue which has been inserted into the belt lock. In this way, the component which is responsible for the secure locking of the belt tongue is directly interrogated. Here, the photoelectric barrier is arranged in the lower shell such that one section of the locking body or an extension projecting from the latter in one of its end positions, for example, in the locking position, projects into the light path of the photoelectric barrier. For example, in this end position the light path is interrupted, as a result of which a signal is generated by the photoelectric barrier.

In accordance with an exemplary embodiment of the belt lock of the present disclosure, the photoelectric barrier can be made as a reflection photoelectric barrier. In this embodiment, the section of the locking body or of the extension projecting from it, which section projects into the light path, in one end position, for example, in the locking position, is made as a reflector for the light injected by the light source. In the locking position, then the light of the light source is reflected back to the photodetector, as a result of which a signal is generated by the photoelectric barrier.

An exemplary embodiment of the present disclosure implementing the belt lock of the present disclosure provides for the generation of an optical and/or acoustic warning signal for the passengers, for example of a motor vehicle, to fasten their belts. Furthermore, the belt lock of the present disclosure can also provide for the activation or deactivation of mechanisms for inflating airbags for the passengers of a motor vehicle automobile. For one skilled in the art, a host of possible applications is opened up which would exceed the scope of this application to enumerate in total.

Figure 1:
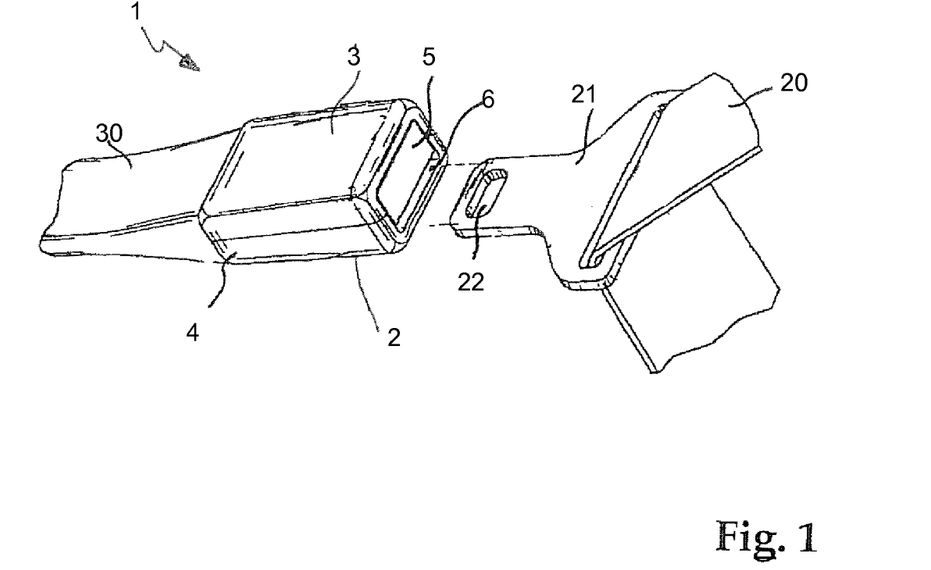
FIG. 1 shows a perspective view of a belt lock with the belt lock tongue indicated.

A belt lock of a safety belt system, for example, in a motor vehicle, shown schematically in FIG. 1 has a known structure and is labeled overall with reference number 1. The belt lock 1 is located on the end of a belt lock anchor 30 and is used for accommodation and detachable locking of a belt tongue 21 which is connected to a safety belt 20. The belt lock 1 encompasses a belt lock housing 2 which is injected from a plastic material and which is made open on its side facing away from the belt lock anchor 30. The belt lock housing 2 includes an upper shell 3 and a lower shell 4. A locking mechanism for the belt lock tongue 20 is accommodated within the belt lock housing 2. An unlocking button 5 for the locking mechanism extends over most of the open region of the belt lock housing 2 and leaves an insertion slot 6 for the belt tongue 20 open. The locking mechanism locks in a recess 22 of the belt tongue 21 when the belt tongue 20 is inserted into the insertion slot 6. The belt tongue 20 is released by actuating the unlocking button 5, especially by pressing the unlocking button 5 in the longitudinal direction of the belt lock housing 2.

FIGS. 2 to 6 each schematically show a longitudinally cut representation of the belt lock 1 from FIG. 1. The representations differ essentially only by the different versions of a state sensor for detection of the locking state of the safety belt system. The same reference numbers therefore label the same components.

The belt lock housing 2 is composed of an upper shell 3 and a lower shell 4. The upper shell 3 and the lower shell 4 are components which may be produced in an injection molding method from a suitable plastic. Within the space surrounded by the belt lock housing 2, there is a locking mechanism which is labeled 10 overall. A frame 11 which is formed from two flat metal parts borders a gap-shaped guide channel in which there is an ejector 12 which, when the belt tongue 21 of the safety belt is inserted through the insertion slot 6, can be moved against the reset force of a spring 13. Moving the ejector 12 releases a locking body 14 which is pretensioned, for example, by a bistable leaf spring 15. In this way, the locking body 14 can slide into the recess 22 in the belt tongue 21 in order to lock it against pulling back. To release the lock, the unlocking button 5 is pushed by pressing down in the longitudinal direction of the belt lock housing 2. In doing so, a bevel on the unlocking button 5 slides under a corresponding bevel on the locking element 14 and presses it up until the bistable leaf spring 15 again completely pulls back the locking body 14. In this way, the belt tongue 21 is released again and is pushed again out of the belt lock housing 2 by the spring-loaded ejector 12 through the insertion slot 6.

In order to signal to the user of the safety belt system that the safety belt is locked in the belt lock, and/or for the activation or deactivation of airbag systems in the motor vehicle, the belt lock 1 is equipped with a state sensor. The state sensor in all exemplary embodiments which are shown in FIGS. 2 to 6 includes an electronic sensor element which is located in the lower shell 4 of the belt lock housing 2. In this way, the more or less sensitive electronic sensor element can be premounted in the lower shell 4 independently of the locking system 10.

Figure 2:
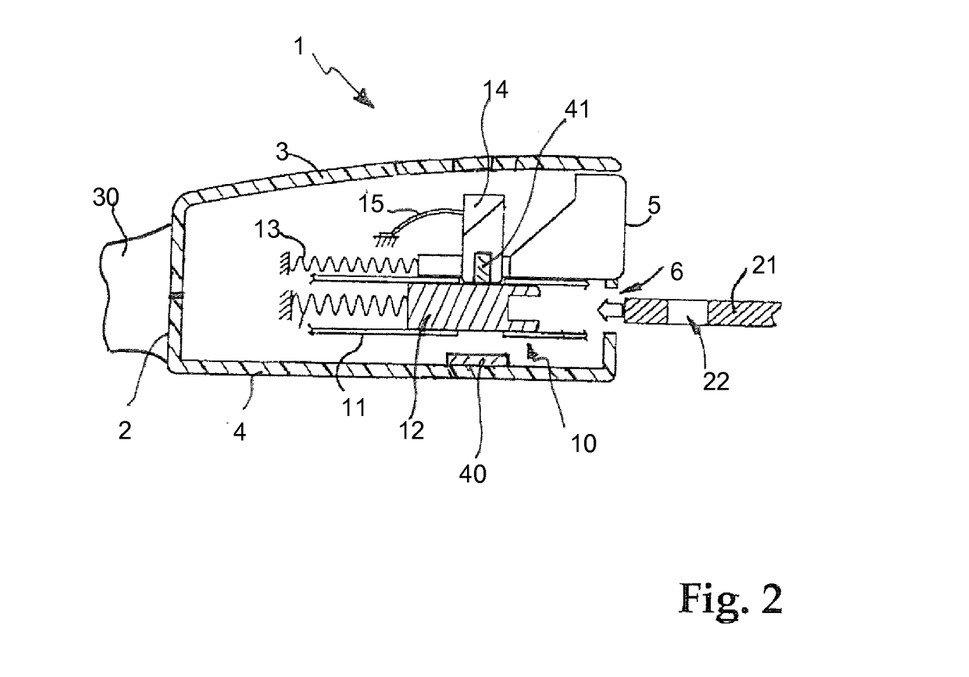
FIG. 2 shows a longitudinal section of an exemplary embodiment of the belt lock with a Hall sensor in a lower shell of a belt lock housing.

The exemplary embodiment of a belt lock 1 equipped as shown in FIG. 2 in the lower shell 4 includes an electronic sensor element which is made as a Hall sensor 40. Hall sensors including evaluation electronics are available on the market in various configurations and sizes. Their operation is well known to one skilled in the pertinent art so that it will not be detailed here. The Hall sensor 40 which is located in the lower shell 4 interacts with the locking body 14 which is equipped with a permanent magnet 41 for this purpose. Alternatively, the locking body could also be made entirely as a permanent magnet. Changing the position of the locking body 14 changes the magnetic field which acts on the Hall sensor 40. This changes the signal of the Hall sensor 40 and at the output of the Hall sensor 40 the state change can be tapped as a voltage change. In one alternative version, the permanent magnet can also be located in the ejector 12. In its axial displacement, the magnetic field acting on the Hall sensor 40 likewise changes, and a signal is generated by the Hall sensor 40.

Figure 3:
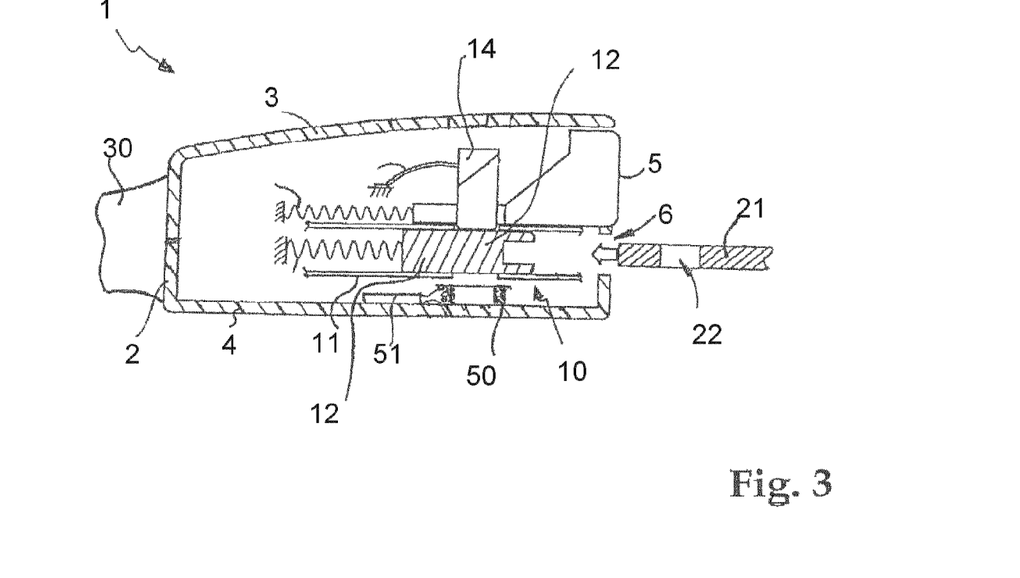
FIG. 3 shows a longitudinal section of an exemplary embodiment of the belt lock with a coil in the lower shell.

In the exemplary embodiment of the belt lock 1 shown in FIG. 3, the electronic sensor element which is located in the lower shell 4 is made as an electrical coil 50. The locking body 14 or an extension projecting from it are made metallic at least in areas. The execution of the sensor element as a coil 50 exploits the variability of the inductance of the coil as a result of the change in the position of the locking body 14. The arrangement is invulnerable to electromagnetic noise fields and to an interfering magnet which the user of the safety belt can have inserted, for example. Due to the absence of moving mechanical contacts or the like, there is no mechanical wear.

A simple manner of ascertaining a change of the inductance arises when the coil 50 is a component of an oscillator circuit. Such an oscillator circuit includes a capacitor and a coil which are connected in series or in parallel. The following applies to the natural frequency of the oscillator circuit:

$$f_r = (1/2\pi) \cdot 1/(L \cdot C)^{1/2}$$

In the serial as well as the parallel circuit versions, the natural frequency of the oscillator circuit is proportional to the inverse of the square root of the inductance. If the inductance is changed, the natural frequency of the oscillator circuit also changes.

An exemplary embodiment of the present disclosure provides for that oscillator circuit to be connected to an evaluation element 51. The evaluation element 51 allows, for example, the stipulation of a threshold value for the oscillation frequency change. When the threshold value is exceeded, for example, when there is a minimum oscillation frequency change, a signal can be generated which indicates the presence of a state change of the component which can be changed with respect to its position. This signal can be used, for example, for activation or deactivation of a warning indicator or can be supplied to a control unit for activation of passenger restraint and capture systems.

The coil 50 advantageously has a central through opening into which a locking body 14 or a metallic extension which projects from it can dip when the position of the locking body changes. In this way, the magnetic flux density B=μ. H is changed; this is expressed in an altered permeability μ. H stands for the magnetic field strength. The relationship between the inductance and the permeability obeys the following relation $$L = (N^2 \cdot \mu \cdot A)/l$$

Here, l stands for the length of the coil, N for the number of turns over the length of the coil, and A for the cross sectional area within the coil. The change of the inductance is thus directly proportional to the change of the permeability which is composed of the product of the permeability $\mu_o$ for the vacuum and a relative permeability number $\mu_r$. Air has a relative permeability number $\mu_r$ of roughly 1. Iron has a relative permeability number $\mu_r$ of >1000.

Relative to the aforementioned relation between the inductance of the coil and the permeability, a relative permeability number $\mu_r$ of roughly 1 means that the locking body 14 is not engaged and the belt lock is not closed. A permeability number $\mu_r$ >1000 conversely means that the locking body 14 or a metallic extension projecting from it has dipped into the coil 50 and locking of the belt lock has taken place.

Figure 4:
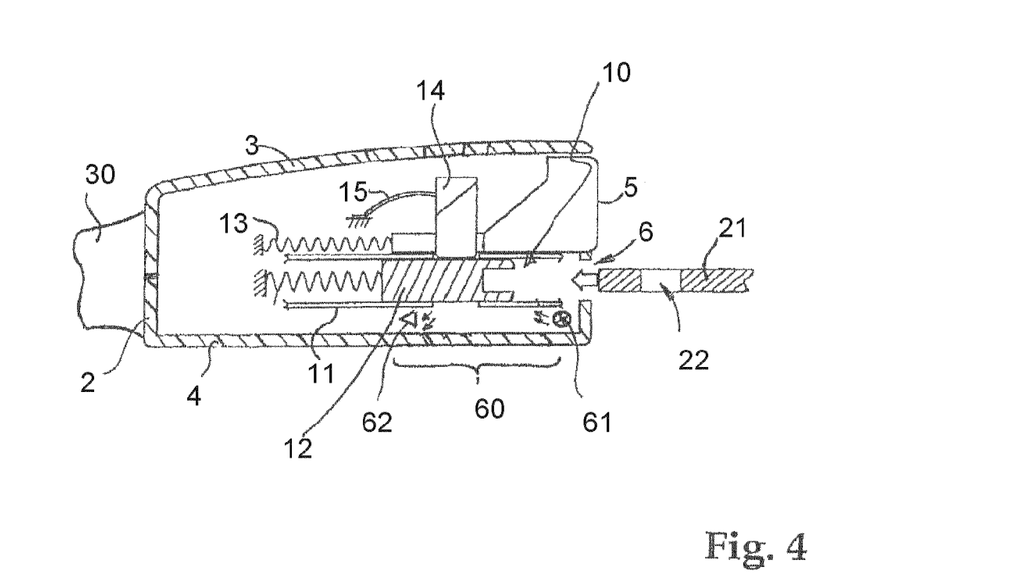
FIG. 4 shows a longitudinal section of an exemplary embodiment of the belt lock with a photoelectric barrier in the lower shell.

FIG. 4 shows an exemplary embodiment of the belt lock 1 in which the electronic sensor element which is located in the lower shell 4 is made as a photoelectric barrier 60. The photoelectric barrier 60 includes a light source 61, for example, a light emitting diode, and a photodetector 62, for example, a photocell. As long as light is incident on the photodetector 62, a small current flows within the photodetector 62. The arrangement of the light source 61 and of the photodetector 62 in the lower shell 4 is chosen such that the path of the light in the locking state is interrupted by the dipped locking body 14 or by an extension which projects from it. In this case, it is a one-way photoelectric barrier. Interrupting the light beam also interrupts the current flow in the photodetector 62. The information acquired about the locking state of the belt lock is used, for example, for activation of an airbag system or for the deactivation of a control light on the dashboard. The light source 61 of the photoelectric barrier 60 has an additional use by its being used for example to illuminate the insertion slot 6 into the belt lock.

Figure 5:
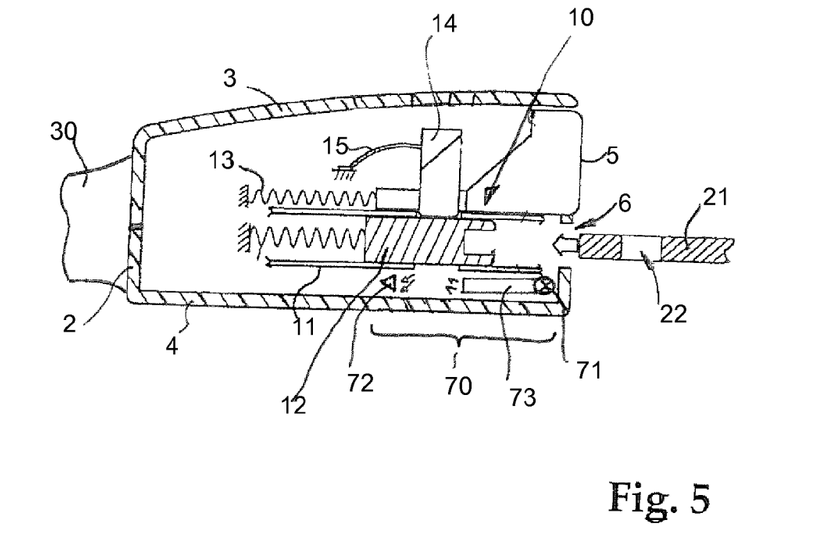
FIG. 5 shows a longitudinal section of an exemplary embodiment of the belt lock with a photoelectric barrier in the lower shell.

The exemplary embodiment of the belt lock 1 shown in FIG. 5 likewise has an electronic sensor element which is made as a one-way photoelectric barrier in the lower shell 4. The photoelectric barrier which is labeled 70 overall in turn has a light source 71, for example a LED, and a photodetector 72. A flexible light tube 73 provides for the light of the light source 71 to be brought nearer the photodetector and its being optimally aligned to it. This arrangement makes it possible to align the light source 71 primarily to the illumination of the insertion slot 6 for the belt tongue 21.

Figure 6:
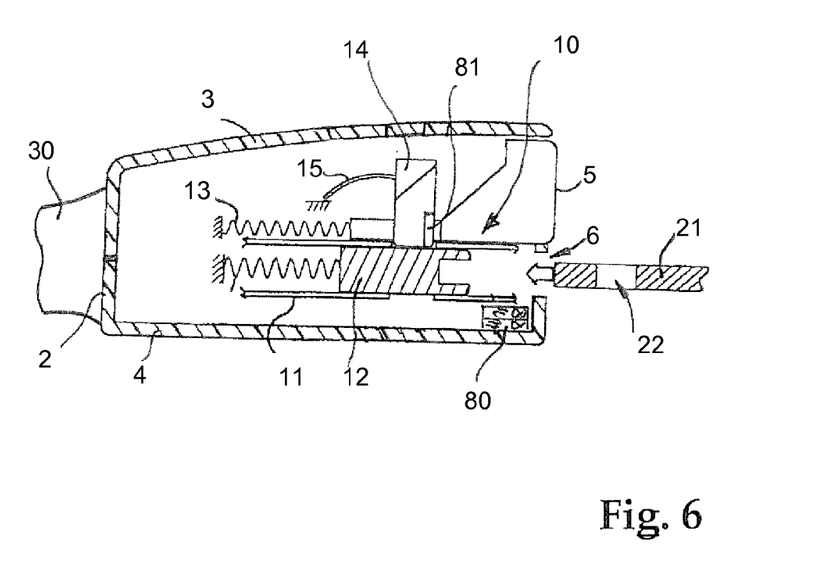
FIG. 6 shows a longitudinal section of an exemplary embodiment of the belt lock with a photoelectric barrier in the lower shell.

In the exemplary embodiment of the belt lock 1 shown in FIG. 6, the electronic sensor element which is located in the lower shell 4 is made as a reflection photoelectric barrier which is labeled 80 overall. In a reflection photoelectric barrier 80, the light source and the photodetector are arranged in a common housing. The locking body 14 or an extension projecting from it has a reflecting region 81 which, with the locking body 14 dipped, for example, in the locking state, reflects the injected light back to the photodetector of the reflection photoelectric barrier. From the resulting change of the current flow in the photodetector, a conclusion about the locking state of the belt lock 1 can be drawn. The arrangement of the reflection photoelectric barrier 80 is advantageously such that the light source is used at the same time also as illumination for the insertion slot of the belt lock 1.

The electronic sensor element which is located in the lower shell is chosen such that its contact-making requires a minimum of electrical lines. Ideally, therefore, electronic sensor elements are used which are connected only via two electrical lines to a higher-order electrical system, for example to a motor vehicle electrical system.

The information which has been obtained by the electronic sensor element which is located in the lower shell about the locking state of the belt lock can be used, for example, for a belt warning indication by an optical and/or acoustic warning signal being generated which means to the passenger or passengers of a motor vehicle to buckle up depending on the detected locking state of the safety belt system. Furthermore, the belt lock which is equipped according to the present disclosure can also be used for activation or deactivation of mechanisms for inflating airbags for the passengers of a motor vehicle. If there is no passenger in the vehicle, the airbags on the passenger side are deactivated for example based on the detected locking state (open).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A belt lock comprising:
   a state sensor for detection of a locking state of a safety belt system,
   a belt lock housing having an upper shell and a lower shell; and
   a locking mechanism which is located in the belt lock housing for insertion of a belt tongue which has a component which changes its location from a first end position into a second end position when the locking mechanism is actuated,
   wherein the state sensor is configured to monitor actuation of the locking mechanism by monitoring the position of the component of the belt tongue, and
   wherein the state sensor includes an electronic sensor element which is located in the lower shell.

2. The belt lock as claimed in claim 1, wherein the electronic sensor element located in the lower shell is connected via two conductors to a higher-order electrical system.

3. The belt lock as claimed in claim 1, wherein the electronic sensor element which is located in the lower shell is a Hall sensor, and wherein the monitored component contains a magnet.

4. The belt lock as claimed in claim 3, wherein the monitored component is a locking body for the belt tongue which has been inserted into the belt lock housing.

5. The belt lock as claimed in claim 3, wherein the monitored component is an ejector.

6. The belt lock as claimed in claim 1, wherein the electronic sensor element which is located in the lower shell includes a coil whose inductance is configured to be changed based on a change in the position of the monitored component.

7. The belt lock as claimed in claim 6, wherein the monitored component is a locking body which is metallic at least in areas for the belt tongue which has been inserted into the belt lock housing.

8. The belt lock as claimed in claim 6, wherein at least one of the locking body and a metallic extension which projects away from the locking body in one of its end positions is configured to dip in part axially into the interior of the coil, wherein the one of the end positions includes one of the first end position and the second end position.

9. The belt lock as claimed in claim 6, wherein the coil is a component of an oscillator circuit.

10. The belt lock as claimed in claim 9, comprising:
    an evaluation element connected to the oscillator circuit, wherein the evaluation element is configured to, when a definable oscillation frequency change is exceeded, generate a signal which indicates a presence of a state change of the component which can be changed with respect to its position.

11. The belt lock as claimed in claim 1, wherein the electronic sensor element which is located in the lower shell is a photoelectric barrier.

12. The belt lock as claimed in claim 11, wherein the photoelectric barrier includes a light source to illuminate an insertion slot into the belt lock housing.

13. The belt lock as claimed in claim 11, wherein the monitored component is a locking body for the belt tongue which has been inserted into the belt lock housing.

14. The belt lock as claimed in claim 13, wherein one section of the locking body or an extension which projects from the locking body in one of its end positions is configured to project into the light path of the photoelectric barrier.

15. The belt lock as claimed in claim 14, wherein the photoelectric barrier is a reflection photoelectric barrier, and wherein the section of the locking body or of the extension projecting from the locking body projecting into the light path is made as a reflector for injected light.

16. The belt lock according to claim 1, wherein the state sensor is configured to generate an optical and/or acoustic warning signal.

17. The belt lock according to claim 16, wherein the generated warning signal is output for the activation or deactivation of mechanisms for inflating airbags for the passengers of a motor vehicle.

18. The belt lock as claimed in claim 1, wherein the safety belt system is comprised in a motor vehicle.

19. The belt lock as claimed in claim 2, wherein the electronic sensor element which is located in the lower shell is a Hall sensor, and wherein the monitored component contains a magnet.

20. The belt lock as claimed in claim 19, wherein the monitored component is a locking body for the belt tongue which has been inserted into the belt lock housing.

21. The belt lock as claimed in claim 19, wherein the monitored component is an ejector.

22. The belt lock as claimed in claim 8, wherein at least one of the locking body and the metallic extension which projects away from the locking body in the locking position is configured to dip in part axially into the interior of the coil.

23. The belt lock as claimed in claim 2, wherein the electronic sensor element which is located in the lower shell includes a coil whose inductance is configured to be changed based on a change in the position of the monitored component.

24. The belt lock as claimed in claim 23, wherein the monitored component is a locking body which is metallic at least in areas for the belt tongue which has been inserted into the belt lock housing.

25. The belt lock as claimed in claim 23, wherein at least one of the locking body and a metallic extension which projects away from the locking body in one of its end positions, for example in the locking position, is configured to dip in part axially into the interior of the coil.

26. The belt lock as claimed in claim 24, wherein the coil is a component of an oscillator circuit.

27. The belt lock as claimed in claim 26, comprising:
an evaluation element connected to the oscillator circuit, wherein the evaluation element is configured to, when a definable oscillation frequency change is exceeded, generate a signal which indicates a presence of a state change of the component which can be changed with respect to its position.

28. The belt lock as claimed in claim 25, wherein the coil is a component of an oscillator circuit.

29. The belt lock as claimed in claim 28, comprising:
an evaluation element connected to the oscillator circuit, wherein the evaluation element is configured to, when a definable oscillation frequency change is exceeded, generate a signal which indicates a presence of a state change of the component which can be changed with respect to its position.

30. The belt lock as claimed in claim 12, wherein the light source includes an LED.

31. The belt lock as claimed in claim 2, wherein the electronic sensor element which is located in the lower shell is a photoelectric barrier.

32. The belt lock as claimed in claim 31, wherein the photoelectric barrier includes a light source to illuminate an insertion slot into the belt lock housing.

33. The belt lock as claimed in claim 32, wherein the monitored component is a locking body for the belt tongue which has been inserted into the belt lock housing.

34. The belt lock as claimed in claim 33, wherein one section of the locking body or an extension which projects from the locking body in one of its end positions is configured to project into the light path of the photoelectric barrier.

35. The belt lock as claimed in claim 34, wherein the photoelectric barrier is a reflection photoelectric barrier, and
wherein the section of the locking body or of the extension projecting from the locking body projecting into the light path is made as a reflector for injected light.

36. The belt lock as claimed in claim 1, wherein:
the housing includes an insertion slot into which the belt tongue is configured to be inserted in a first direction;
wherein the locking mechanism includes a locking body configured to be moved in a second direction to actuate the locking mechanism when the component of the belt tongue is moved in the first direction to the second end position, the first direction being substantially perpendicular to the second direction; and
wherein the electronic sensor element is attached to the lower shell below the locking body.

37. The belt lock as claimed in claim 36, wherein the lower shell is located below the insertion slot, and the upper shell is located above the insertion slot.

* * * * *